United States Patent

Smith, Jr.

[15] 3,642,436
[45] Feb. 15, 1972

[54] METHOD FOR PREPARING LITHIUM SULFIDE COMPOUNDS

[72] Inventor: William Novis Smith, Jr., Exton, Pa.
[73] Assignee: Foote Mineral Company, Exton, Pa.
[22] Filed: Nov. 14, 1969
[21] Appl. No.: 877,009

[52] U.S. Cl..................................23/134, 23/181, 23/212, 136/6
[51] Int. Cl..................C01b 17/22, C01b 17/16, C01b 1/02
[58] Field of Search....................................23/134, 181, 212

[56] References Cited

UNITED STATES PATENTS 3,471,249  10/1969  Markant et al......................23/134 X

FOREIGN PATENTS OR APPLICATIONS 891,828  3/1962  Great Britain.........................23/134

OTHER PUBLICATIONS

J. W. Mellor's "A comprehensive Treatise on Inorganic and Theoretical Chemistry," Vol. 2, 1922 Ed., pages 66 and 67. Longmans, Green & Co., New York.

Primary Examiner—Edward Stern
Attorney—Howson and Howson

[57] ABSTRACT

A lithium reactant selected from the group consisting of lithium metal or lithium hydride is reacted with hydrogen sulfide in the proportion from about one-half mol to about 1 mol of hydrogen sulfide per mol of lithium reactant, in the presence of a strong coordinating ether solvent to produce at least one lithium sulfide compound selected from the group consisting of lithium sulfide and lithium hydrosulfide.

12 Claims, No Drawings

METHOD FOR PREPARING LITHIUM SULFIDE COMPOUNDS

U.S. Pat. No. 2,953,617, describes a process for preparing lithium sulfide in which lithium metal and sulfur are sealed in a vessel and heated to about 300° C. in a vacuum for 24 to 48 hours, after which all of the lithium has been converted to lithium sulfide ($Li_2S$). According to this patent, the lithium sulfide may be combined with a transition metal such as manganese to form a lithium manganese sulfide which can be used as one element in a thermoelectric device useful in refrigeration applications.

Lithium sulfide and lithium hydrosulfide can also be used as such or in solution as an electrolyte in a lithium-sulfur battery, or in preparing organo sulfur compounds such as sulfur-containing vulcanization agents.

It is the principal object of this invention to provide a method for the preparation of lithium sulfide and/or lithium hydrosulfide which is rapid, simple and economical.

It is also an object of this invention to provide a method for the preparation of lithium sulfide or lithium hydrosulfide which produces a good yield of a high-purity product.

It is a further object of this invention to provide a method for the preparation of mixtures of lithium sulfide and lithium hydrosulfide.

These and other objects will become apparent from a consideration of the following specification and claims.

SUMMARY OF THE INVENTION

The method of preparing lithium sulfide compounds according to the present invention comprises reacting from about ½ mol to about 1 mol of hydrogen sulfide with 1 mol of a finely divided lithium reactant selected from the group consisting of lithium metal and lithium hydride in a strong coordinating ether solvent to provide at least one lithium sulfide compound selected from the group consisting of lithium sulfide and lithium hydrosulfide.

The lithium reactant employed will advantageously be finely divided; that is, the lithium reactant will have a particle size of −30 mesh, and preferably −100 mesh. Lithium metal may be utilized in the well-known dispersion form. Such dispersions are prepared by rapidly stirring molten lithium metal into an inert liquid, such as mineral oil or toluene, so that the metal solidifies as very tiny droplets, generally no more than about 100 microns in size and most usually from about 25 to about 75 microns in size. The finely divided lithium metal may be filtered from the liquid to provide, after washing and drying, what is known as a dry dispersion, or powder. Finely divided lithium hydride may also be used in the reaction in place of the lithium metal.

The lithium metal may contain 1 percent, or less, by weight, based on the weight of the lithium, of sodium, although no significant advantage is found if sodium is present in the lithium metal.

As is generally true in reactions involving lithium reactants, it is preferred that the reaction be carried out in an atmosphere free of carbon dioxide and water, such as an inert atmosphere of argon, nitrogen, and the like. Preferably, the reaction will be carried out under an atmosphere of argon when finely divided lithium metal is used and under an atmosphere of nitrogen when lithium hydride i utilized in the reaction.

The other principal reactant in the process is hydrogen sulfide. The hydrogen sulfide gas is supplied as such to the reaction.

The reactions proceed according to the equations:

I: $2Li + H_2S \rightarrow Li_2S + H_2\uparrow$
II: $2Li + 2H_2S \rightarrow 2LiSH + H_2\uparrow$
III: $2LiH + H_2S \rightarrow Li_2S + 2H_2\uparrow$
IV: $2LiH + 2H_2S \rightarrow 2LiSH + 2H_2\uparrow$ Reactions I and III above stoichiometrically require ½ mol of hydrogen sulfide for each mol of lithium reactant. The reactions will proceed with a combination of reactants within the range of from about 0.5 mol to about 0.7 mol hydrogen sulfide per mol of lithium reactant (Reactions I and III) to about 1 mol of hydrogen sulfide per mol of lithium reactant (Reactions II and IV). Those reactions carried out with a greater amount of lithium reactant, on a molar basis, favor the formation of lithium sulfide, while reactions with more hydrogen sulfide, on a molar basis, favor the formation of lithium hydrosulfide.

To ensure that substantially all of the lithium reactant is consumed in a given reaction, it is preferred that an excess of hydrogen sulfide be included in the reaction. Accordingly, reactions I and III above may be carried out with from about 0.5 to about 0.7, preferably about 0.6 mol, of hydrogen sulfide per mol of lithium reactant. The use of excess hydrogen sulfide does, however, favor the production of lithium hydrosulfide. The lithium hydrosulfide can be converted to lithium sulfide by the addition of heat according to the equation:

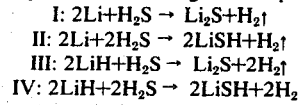

Conversely Reactions II and IV which produce lithium hydrosulfide are carried out with a ratio of about 1 mol of hydrogen sulfide per mol of lithium reactant. Of course, mixtures of lithium sulfide and lithium hydrosulfide are produced when the reactants are combined in ratios between about 0.5 and about 1 mol of hydrogen sulfide per mol of lithium reactant.

The method of the present invention is carried out in a solvent consisting essentially of a strong coordinating ether solvent liquid. Suitable strong coordinating ether solvents include tetrahydrofuran, tetrahydropyran, ethylene glycol dimethyl ether, commonly known as "Glyme," ethylene glycol diethyl ether, and other "glyme" analogs, such as the dimethyl and diethyl ethers of diethylene, triethylene and tetraethylene glycol, dioxane and mixtures of two or more of these solvents. A minor proportion of another type of solvent, like dimethyl ether or diethyl ether, which does not detract materially from the advantageous characteristics of the strong coordinating ether solvent, might be included but is preferably avoided.

In carrying out the present method, the lithium reactant is preferably incorporated into the strong coordinating ether solvent, and the hydrogen sulfide is then added. In accordance with the preferred practice, the reaction mixture is agitated well during the hydrogen sulfide addition.

The reaction may be carried out at any temperature between 0° C. and reflux. The preferred temperature range for the reaction is from about 25° to about 40° C.

Following the reaction, the lithium sulfide compound which is formed is filtered, and the residue is washed with an organic solvent, such as diethyl ether, and dried, advantageously under a vacuum of, say, from about 0.1 to about 1 mm. of mercury. If it is desired to recover substantially pure lithium sulfide as the reaction product, the residue is dried at a temperature of from about 150° to about 220° C., preferably about 200° C. under a vacuum for a period of time sufficient to convert lithium hydrosulfide present substantially to lithium sulfide, from about ½ to about 3 hours usually being sufficient.

If it is desired to recover substantially pure lithium hydrosulfide as the product, the reaction product is filtered, the residue is washed with an organic solvent, such as diethyl ether, and dried at a temperature of from about 0° to about 35° C., preferably about 15° to about 25° C., under a vacuum for a period of about ½ to about 2 hours.

The following examples are given for the purpose of illustration and are not intended to limit the scope of the invention in any way.

EXAMPLE 1

A round bottom, three-necked, 5-liter flask is equipped with a stirrer, thermometer, condenser and gas addition tube and is flushed with argon. The flask is then charged with 90 g. of pure lithium metal (powder) and 2,500 ml. of tetrahydrofuran. Then 365 g. of hydrogen sulfide is added over a 6-hour period with stirring at a temperature maintained between 25° to 35° C. with cooling. Under an atmosphere of argon, the reaction slurry obtained is filtered, the residue is washed with 500 ml. of diethyl ether and then dried at room temperature under 0.3 mm. of Hg for two hours. The product weighs 442 g. and analyzes 97 percent purity as lithium hydrosulfide based on lithium analysis, for a yield of 85.5 percent.

EXAMPLE 2

Following the procedure of Example 1, the flask is charged with 449 g. of lithium metal powder and 10 L. of tetrahydrofuran. Then 1,318 g. of hydrogen sulfide is added over a 7-hour period with stirring at a temperature maintained between 30° to 40° C. The reaction mixture is then stirred at 30° C. for 1 hour longer, and then heated gradually to 60° C. over an hour, refluxed briefly, and cooled under an argon atmosphere to 8° C. Under an argon atmosphere, the slurry is then filtered, the residue is washed with 2 liters of diethyl ether and dried at 200° C. under 0.3 mm. of Hg for 1 hour. The yield is 1,436 g., or 96.5 percent of an off-white lithium sulfide powder having a purity of 97.2 percent based on sulfur and lithium analysis.

EXAMPLE 3

Following the procedure of Example 1, utilizing a 500 ml. round bottom flask, 11 g. of lithium hydride in 200 ml. of tetrahydrofuran is added to the flask under a nitrogen atmosphere. The flask is maintained at 35° to 40° C. while 55 g. of hydrogen sulfide is added with agitation over 1.5 hours. The slurry is agitated for 3 hours more at room temperature, filtered and the residue washed with 50 ml. of diethyl ether. The white powder product is dried at 220° C. under 1 mm. of Hg for 2 hours. The lithium sulfide product weighs 26 g. and has a purity of 97 percent by sulfur analysis for a yield of 83 percent.

EXAMPLE 4

Following the procedure of Example 3, 3 g. of lithium metal powder in 200 ml. of ethylene glycol dimethyl ether is added to the flask under an argon atmosphere. The flask is maintained at 30° to 40° C. while 10 g. of hydrogen sulfide is added with agitation over a 3-hour period. Under an argon atmosphere, the slurry is filtered and the residue washed with 50 ml. of diethyl ether. The product is dried at 200° C. under 0.3 mm. of Hg for 2 hours. The lithium sulfide product weighs 8.9 grams and has a purity of 90 percent by sulfur analysis for a yield of 89 percent.

What is claimed is:

1. A process for preparing a lithium sulfide compound which comprises reacting from about ½ mol to about 1 mol of hydrogen sulfide with 1 mol of a finely divided lithium reactant selected from the group consisting of lithium metal and lithium hydride in a solvent selected from the group consisting of tetrahydrofuran, tetrahydropyran, ethylene glycol dimethyl ether, ethylene glycol diethyl ether, the dimethyl and diethyl ethers of diethylene, triethylene and tetraethylene glycols, dioxane and mixtures of two or more of said solvents, said reaction being carried out in an inert atmosphere, to provide at least one lithium sulfide compound selected from the group consisting of lithium sulfide and lithium hydrosulfide.

2. The process of claim 1 wherein from about 0.5 to about 0.7 mol of hydrogen sulfide are reacted with 1 mol of the lithium reactant.

3. The process of claim 2 wherein about 0.6 mol of hydrogen sulfide are reacted with 1 mol of the lithium reactant.

4. The process of claim 1 wherein about 1 mol of hydrogen sulfide is reacted with 1 mol of the lithium reactant.

5. The process of claim 1 wherein the solvent is tetrahydrofuran.

6. The process of claim 1 wherein the solvent is ethylene glycol dimethyl ether.

7. The process of claim 1 wherein the reaction is carried out at a temperature of from about 0° C. to about reflux.

8. The process of claim 7 wherein the process is carried out at a temperature of from about 25° to about 40° C.

9. The process of claim 1 wherein the lithium sulfide compound prepared is lithium sulfide and wherein the lithium sulfide is recovered from the reaction by drying the reaction product at a temperature of from about 150° to about 220° C. for a period of time sufficient to convert any lithium hydrosulfide present substantially to lithium sulfide.

10. The process of claim 9 wherein the reaction product is dried at a temperature of about 200° C. for from about ½ to about 3 hours.

11. The process of claim 1 wherein the lithium sulfide compound prepared is lithium hydrosulfide and wherein the lithium hydrosulfide is recovered by drying the reaction product at a temperature of from about 0° to about 35° C. under vacuum.

12. The process of claim 11 wherein the reaction product is dried at a temperature of from about 15° to about 25° C. for from about ½ to about 2 hours.

* * * * *